United States Patent [19]
Nobuta et al.

[11] Patent Number: 5,258,853
[45] Date of Patent: Nov. 2, 1993

[54] FACSIMILE APPARATUS HAVING IMAGE MEMORY DEVICE

[75] Inventors: Hiroshi Nobuta, Yokohama; Ichiro Kohno, Tokyo, both of Japan

[73] Assignee: Canon Kabushiki Kaisha, Tokyo, Japan

[21] Appl. No.: 673,525

[22] Filed: Mar. 22, 1991

[30] Foreign Application Priority Data

Mar. 28, 1990 [JP] Japan .................................. 2-76735

[51] Int. Cl.$^5$ .............................................. H04N 1/40
[52] U.S. Cl. .................................... 358/444; 358/403; 358/404
[58] Field of Search ............... 358/400, 402, 403, 404, 358/434, 443, 444, 441, 442; 379/100; 360/39

[56] References Cited

U.S. PATENT DOCUMENTS

| | | | |
|---|---|---|---|
| 4,506,342 | 3/1985 | Yamamoto | 358/403 |
| 4,646,160 | 2/1987 | Iizuka et al. | 358/402 |
| 4,768,099 | 8/1988 | Mukai | 358/403 |
| 4,774,590 | 9/1988 | Haganuma et al. | 358/444 |
| 4,789,902 | 12/1988 | Shimura | 358/443 |
| 4,805,135 | 2/1989 | Ochi et al. | 358/406 |
| 4,876,604 | 10/1989 | Nobuta | 358/400 |
| 5,105,284 | 4/1992 | Sakata et al. | 358/444 |

FOREIGN PATENT DOCUMENTS

0031653 2/1983 Japan .................................. 358/441

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

Disclosed is a compact, light-weight facsimile apparatus which is reduced in cost, furnished with a large storage capacity and provided with flexibility in terms of handling by utilizing a magnetic tape recording/playback mechanism as a storage source of image data and providing an image data memory on the magnetic tape. Tape-drive control and format are so designed that a code representing that image data has been stored on the tape, management information, which includes transmission/reception control information and information indicating storage position, and the image data are stored on the tape based on a prearranged storage format.

23 Claims, 18 Drawing Sheets

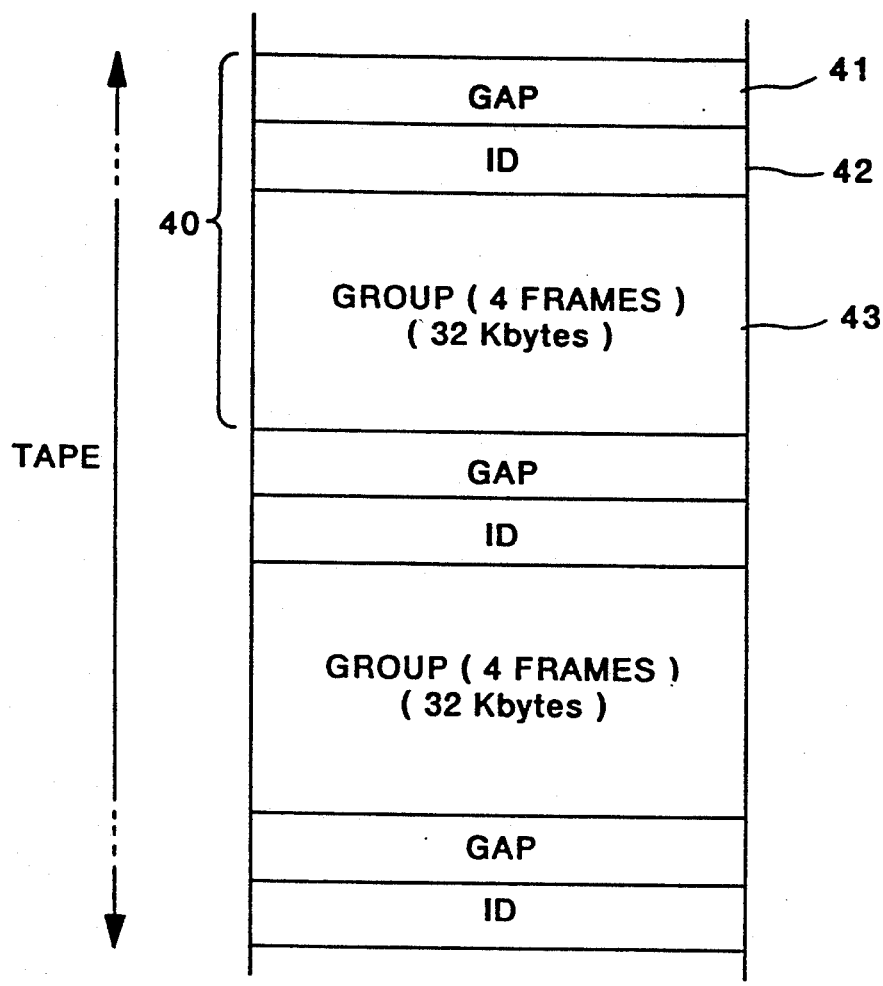
F I G. 4

| VALUE | TYPE OF CONTROL |
|---|---|
| 0 | TRANSMISSION DESIGNATION<br>( DATA ERASURE AFTER EXECUTION ) |
| 1 | TRANSMISSION DESIGNATION<br>( PRESERVE DATA AFTER EXECUTION ) |
| 2 | RECEPTION COMPLETED |
| 3 | TRANSMISSION COMPLETED |
| 4 | NO FILE |

F I G. 6B

FACSIMILE APPARATUS HAVING IMAGE MEMORY DEVICE

BACKGROUND OF THE INVENTION

1. Field of the Invention

This invention relates to a facsimile apparatus and, more particularly, to a facsimile apparatus for transmitting a digitally recorded image to a magnetic tape.

2. Description of the Prior Art

A requirement in a facsimile apparatus is a memory medium, which serves as an image memory, that is low in cost, compact and large in capacity. In recently developed facsimile apparatus, colorization, in addition to advances in optical reading techniques and digital image processing techniques, has lead to a great increase in the volume of information in the image data handled. Meanwhile, efforts have been made to lower bit cost by enlarging the capacities of semiconductor memories, floppy disks and hard disks and, on the memory supply side, to enlarge the capacity, lower the cost and reduce the size of memory media.

However, semiconductor memories have a higher bit cost than hard disks and floppy disks, the non-volatility of data is difficult to achieve and power consumption cannot be ignored. For this reason, semiconductor memories are used for temporary storage of image data.

Floppy disks have a large capacity on the order of 10 to 20 M-bytes. However, when these disks are used in a facsimile apparatus, in which the volume of one page of image data is 2-4 M-bytes, the number of pages capable of being stored is limited.

Hard disks, on the other hand, have a large capacity of 40-500 M-bytes and are widely employed in recent facsimile apparatus. However, since large-capacity hard disks require a large and costly operating mechanism, the use of these disks in facsimile apparatus increases the size and raises the cost of the facsimile apparatus itself. Furthermore, if the hard disk is accommodated within the facsimile apparatus, maintenance for installing and extracting the disk is time-consuming. Furthermore, in terms of effectiveness as a memory medium, data convertibility and portability are problems. In order to solve these problems, a facsimile apparatus that employs both a hard disk and a floppy disk is available, but the cost thereof is high.

SUMMARY OF THE INVENTION

Accordingly, an object of the present invention is to provide a facsimile apparatus having an image-data storage medium which is inexpensive, large in capacity and versatile in terms of handling.

Another object of the present invention is to provide a facsimile apparatus which utilizes a magnetic tape recording/playback mechanism as a storage source of image data and possesses an image data memory on the magnetic tape, thereby eliminating the aforementioned drawbacks encountered in the prior art.

According to the present invention, the foregoing objects are attained by providing a facsimile apparatus for transmitting and receiving an image via storage of image data on a large-capacity storage medium, wherein the large-capacity storage medium is a digital magnetic tape, the apparatus comprising: memory means for storing, on the digital magnetic tape, in a prescribed format based upon a prearranged storage format corresponding to the digital magnetic tape, at least a facsimile identification code which represents that image data for the facsimile apparatus has been stored on the tape, management information which includes control information for controlling transmission and reception of the facsimile apparatus and position information indicating storage position of the image data on the digital magnetic tape, and image data transmitted and received by the facsimile apparatus; and image transmission means for performing transmission and reception of the image based upon the information on the digital magnetic tape stored in the prescribed format based upon the prearranged storage format.

Gaps in accordance with the prearranged storage format are provided on the digital magnetic tape at fixed intervals, and the memory means includes stopping means for stopping the digital magnetic tape at positions of the gaps.

Further, position information is stored on the digital magnetic tape at predetermined areas in correspondence with the gaps and represents the positions of these areas, and the memory means stops, plays back and rewinds the digital magnetic tape in accordance with the position information.

Further, the digital magnetic tape is a digital audio tape, and a storage area for the image data, the management information and the facsimile identification code comprises, in repetitive fashion, the gap of a predetermined number of tracks and a data area of a predetermined number of tracks. The position information is stored in a subordinate data area of each track, and the image data, management information and facsimile identification code are stored in a main data area of each track.

The image transmission means has at least two buffers for temporarily holding image data to be transmitted, and the capacity of the buffers corresponds to the capacity of the data area of the predetermined number of tracks.

According to another aspect of the present invention, the foregoing objects are attained by providing a facsimile apparatus for transmitting and receiving an image via storage of image data on a large-capacity storage medium, wherein the large-capacity storage medium is a digital magnetic tape, the apparatus comprising tape detecting means for detecting that the digital magnetic tape has been loaded, high-speed rewinding means for rewinding the digital magnetic tape when loading thereof has been detected by the tape detecting means, code detecting means for detecting a facsimile identification code at a position at the beginning of the digital magnetic tape, and tape ejecting means for ejecting the digital magnetic tape when the facsimile identification code is not detected by the identification code detecting means.

The facsimile apparatus further comprises alarm means for issuing an alarm if the tape detecting means does not detect loading of the digital magnetic tape for a predetermined period of time, or if the identification code detecting means does not detect a code.

The facsimile apparatus further comprises call starting means for starting a call operation at a destination, in accordance with a designation made by management data within the management area, when it is determined that the digital recording tape is a valid tape, transmitting means for reading the image data out of the digital recording tape and transmitting the same, second high-speed rewinding means for rewinding the digital recording tape at high speed at completion of image transmission, and updating means for updating the management data on the digital recording tape based upon transmission of the image data.

The updating means erases the image data on the digital recording tape, the transmission of which has been completed, when this transmission ends.

Thus, according to the present invention, there is provided a facsimile apparatus having an image-data storage medium which is inexpensive, large in capacity and versatile in terms of handling, this being achieved by utilizing the magnetic tape recording/playback mechanism as the storage source of the image data, providing an image data memory on the magnetic tape, and eliminating loss of data, at resumption of data transfer, caused by slowness of data access possessed by the magnetic tape, or by overrun.

Other objects, features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 and 5 are diagrams showing tape format according to the embodiment;

FIGS. 6A and 6B are diagrams showing the structure of data within a management area of a digital recording tape;

DESCRIPTION OF THE PREFERRED EMBODIMENT

Figure 1:
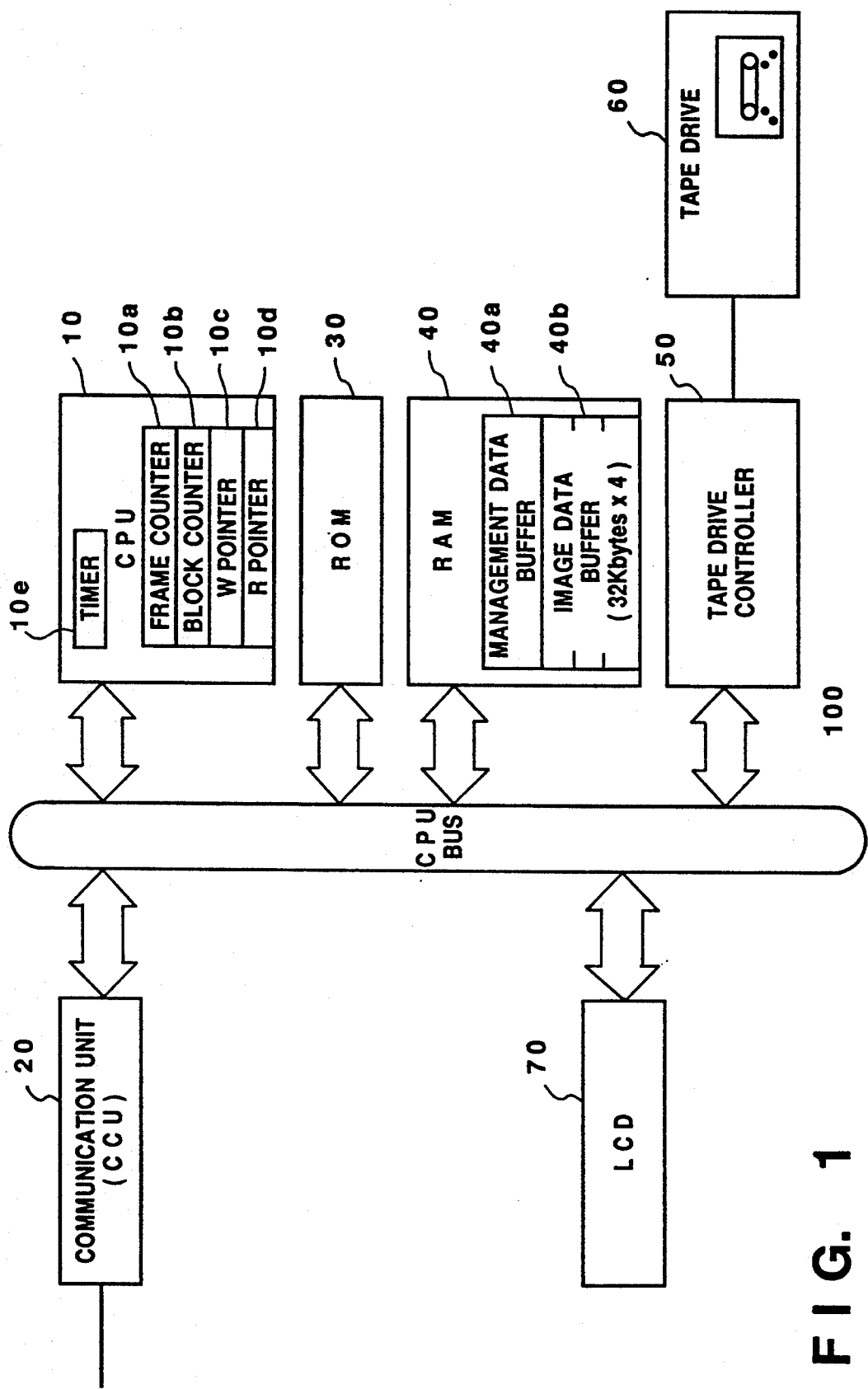
FIG. 1 is a block diagram illustrating an embodiment of a facsimile apparatus according to the present invention.

An embodiment of the present invention will now be described with reference to the accompanying drawings.

In the facsimile apparatus of this embodiment, DAT (digital audio tape) technology is applied to an image memory. In a case where a DAT uses a two-hour tape, the DAT can be employed as a memory having a very large capacity of 1.3 G-bytes (=1300 M-bytes). The tape and tape drive of such a DAT are also inexpensive. Further, the facsimile apparatus of the embodiment is a G4 facsimile connected to an ISDN. Whereas the data rate with a basic ISDN interface is 64 Kbps (8 K-bytes/s), the data transfer rate of a DAT is about 150–200 K-bytes/s. Accordingly, the DAT is outstanding in terms of transfer rate as well.

However, a DAT has a much slower data access speed than a hard disk or floppy disk. If a DAT is to be used as an image memory for a facsimile apparatus, therefore, it is necessary to compensate for this slowness of data access. Specifically, about two to four seconds is needed to start the tape running after it has been stopped, and about 40 seconds is required to fully rewind or fully fast-forward a two-hour DAT. In addition, the time needed for preparations prior to running of the tape cannot be ignored. Furthermore, when an image buffer memory possessed by a facsimile controller is filled to capacity by transfer of data from a DAT, it is required that the tape be stopped to temporarily suspend the data transfer. However, a tape overrun can occur at this time owing to the mechanical parts. Such an overrun can cause loss of data when the data transfer is resumed.

Accordingly, in order to utilize DAT technology and employ a magnetic tape as the image memory of a facsimile apparatus, the following measures (I) through (IX) are required:

(I) An area for managing the information recorded on the tape is provided on the tape at a predetermined location.

(II) Means for detecting loading of the tape is provided, and fast rewinding of the tape is performed automatically when loading has been detected.

(III) A FAX identification code area is provided at the beginning of the tape, a signal within this area is reproduced after rewinding of the tape, and it is determined whether the tape is valid.

(IV) If the tape is found to be invalid in (III) above, the tape is stopped promptly and ejected.

(V) Prescribed parameters necessary for FAX operation are stored en masse in the management area of (I) above.

(VI) In order to coordinate the transfer rate of image data on the bus of a facsimile controller (CPU) and the transfer rate of data within the DAT control circuitry, two or more buffers are provided in an interface between the controller bus and the DATA circuit bus.

(VII) Blank areas (gaps) are provided at prescribed intervals in the image area of the tape.

(VIII) The size of one buffer of the image buffer memory of the facsimile controller is adopted as the effective data size of a portion bracketed by blank areas on the tape.

In addition, though measure (V) above has been established in order to enable reliable retrieval of image data, the following corresponding measure is also provided:

(IX) A procedure is provided in which the image data is reproduced and read from the tape only after the information in the management area on the tape has been copied to a RAM of the facsimile controller.

Construction of the Facsimile Apparatus

FIG. 1 is a block diagram illustrating the construction of a facsimile apparatus according to an embodiment the present invention.

Figure 11:
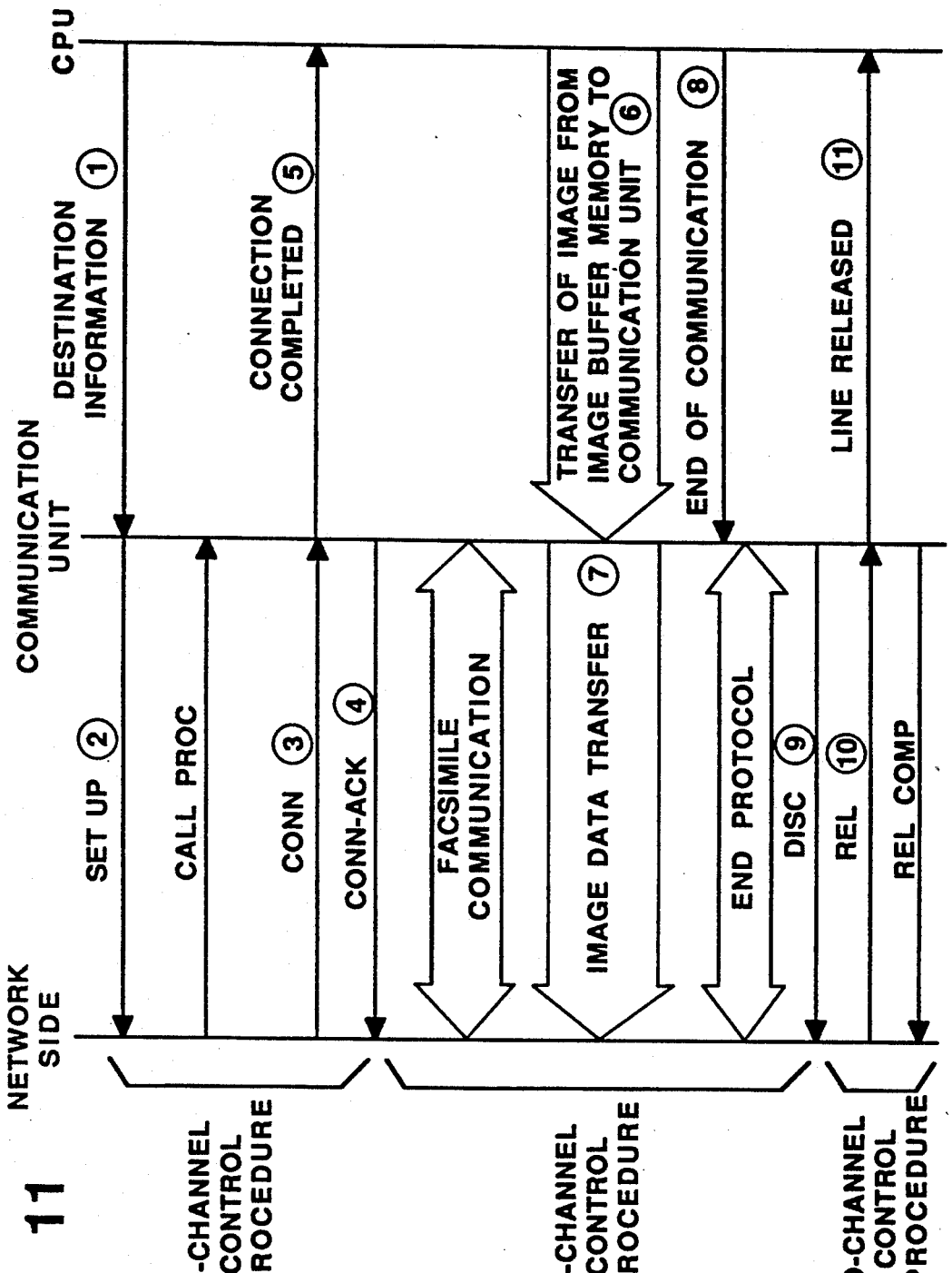
FIG. 11 is a diagram illustrating a procedure for communication between a facsimile controller and a facsimile communication unit.

As shown in FIG. 1, the facsimile apparatus of this embodiment includes a CPU 10, a communication unit 20, a ROM 30, a RAM 40, a tape-drive controller 50, a tape drive 60, an LCD 70, and a CPU bus 100 connected to each of these components. The CPU 10 is a CPU chip for performing control of the overall facsimile apparatus and has a frame counter 10a for controlling the transfer of image data, a block counter 10b, a write (W) pointer 10c, a read (R) pointer 10d, and a timer 10e. The communication unit 20 executes a communication procedure, as shown in FIG. 11. The ROM 30 is a semiconductor memory in which the control program of the CPU 10 is stored. The RAM 40 is a semiconductor memory used as a working area for execution of the program by the CPU 10, and as a buffer for the image data when facsimile communication is executed. The buffer for the image data has a buffer 40a for management data, and a buffer 40b for the image data. The method in which the image-data buffer 40b is used will be described later with reference to FIGS. 7A and 7B. The tape drive 60 drives the tape to perform recording, playback and rewinding (rapid-traverse). The LCD 70 is for displaying error messages and the like.

Figure 2:
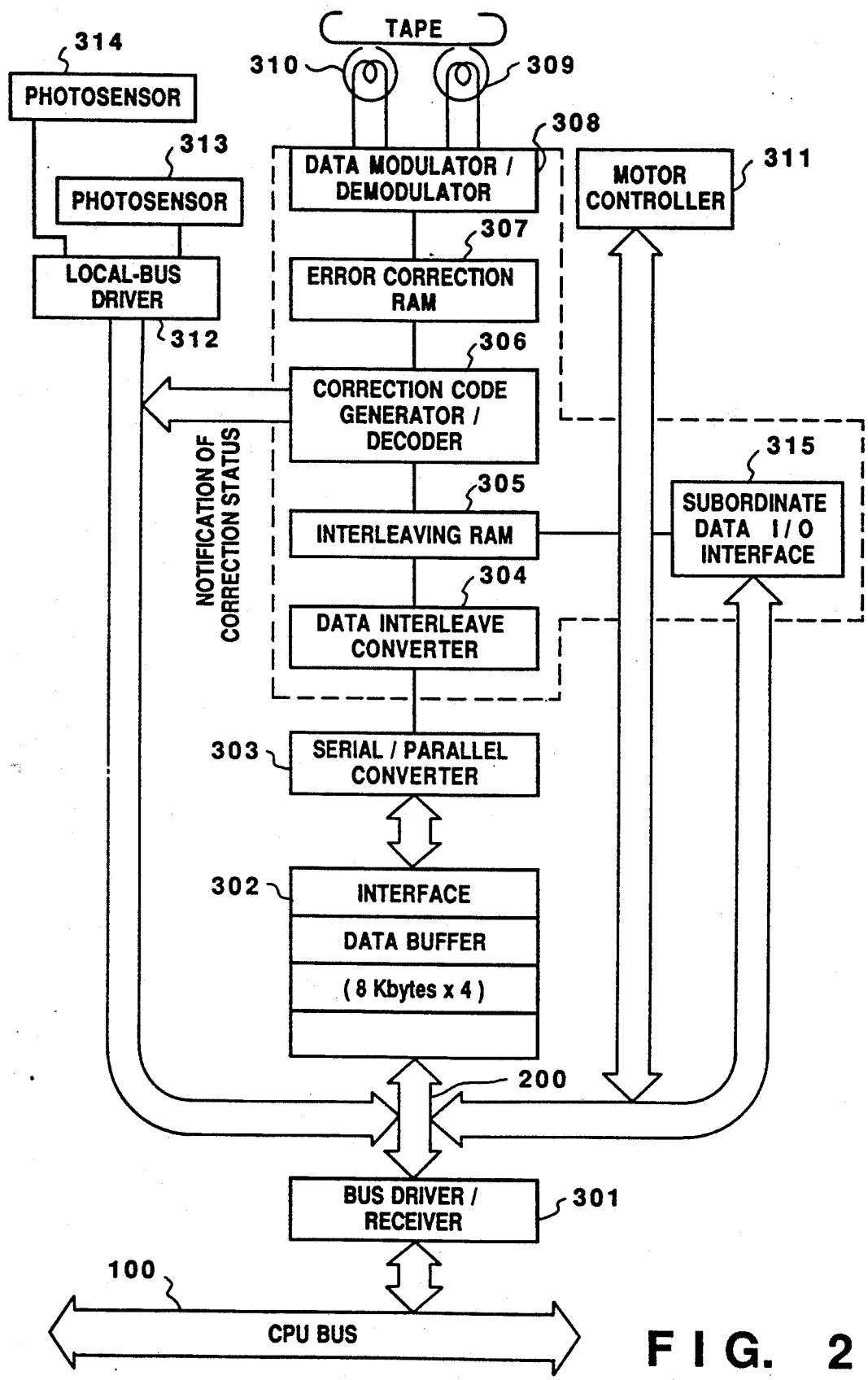
FIG. 2 is a block diagram illustrating the details of a tape-drive controller in the facsimile apparatus of the invention.

FIG. 2 is a block diagram illustrating the construction of the tape-drive controller 50 according to this embodiment.

As shown in FIG. 2, a bus driver/receiver 301 functions to connect the CPU bus 100 of the facsimile apparatus and a local bus 200 of the tape-drive controller 50. An interface data buffer 302 is a FIFO (first-in, first-out) buffer, which furnishes at least two buffers (four eight-K-bytes buffers in this embodiment), for buffering the data speed of data transferred from a serial-parallel converter 303 and the data speed of data transferred to the bus driver/receiver 301 (or the data speed of data transferred from the bus driver/receiver 301 and the data speed of data transferred to the serial-parallel converter 303). The size of one buffer of the interface data buffer 302 is the same as that of a RAM 307 for error correction. Since an error correction is concluded in two tracks (one frame) in terms of R-DAT specifications, the above-mentioned buffer size is 8 K-bytes. Accordingly, the size of one buffer in the interface data buffer 302 also is 8 K-bytes. Even if the data speed on the CPU bus 100 is non-uniform in terms of time, the data speed in a data modulator/de-modulator 308 is held constant by the interface data buffer 302, and the transfer of data can be compensated for by running of the tape at a constant speed. The serial-parallel converter 303 is a circuit for perform-ing a conversion between serial data and parallel data.

A data interleaving conversion circuit 304 executes interleaving of data stipulated by the error correcting method (a rereading Solomon coding method) of R-DAT specifications. An interleaving RAM 305 has a capacity of 8 K-bytes. The output of the RAM 305 is delivered to a circuit 306, which executes error correction-code generation/decoding according to the error correction method mentioned above. The RAM 307 for error correction has a capacity of 8 K-bytes since the error correction is concluded in two tracks (one frame), as described earlier. The data modulator/demodulator 308 includes a recording/playback amplifier and executes such processing as 8-10 conversion coding decided by the R-DAT specifications and synchronous detection. A subordinate data input/output interface 315 is an interface circuit capable of inputting and outputting the contents of subordinate data in an R-DAT data format. In this embodiment, the interface circuit 315 is used in order to read the address information of the data recorded in a subordinate data portion. It should be noted that the block (which includes the components 304 through 308 and 315) indicated by the dashed line is a semiconductor circuit, in the form of a chip, available on the market.

Heads 309, 310 are electromechanical components situated on a rotary cylinder for creating and reading magnetic information on the surface of a tape. In this embodiment, a two-head system is employed. A motor controller 311 is a circuit which, in response to commands from the CPU 10, executes tape loading, high-speed rewind and fast-forward. It also runs the tape in usual fashion and stops the tape. A local-bus driver 312 is a chip which informs the CPU 10, via the bus driver/receiver 301, of the output states of photo-sensors 313, 314. The photosensor 313 senses loading of the tape. The output of the photosensor 313 attains a high logic level when the tape is loaded and assumes a low logic level when the tape has not been loaded. The photosensor 314 senses the beginning of the tape or the end of the tape. The beginning and end of the tape are transparent portions which allow light to pass there-through. This light is sensed by the photosensor 314.

Data Format of the Embodiment

Figure 3:
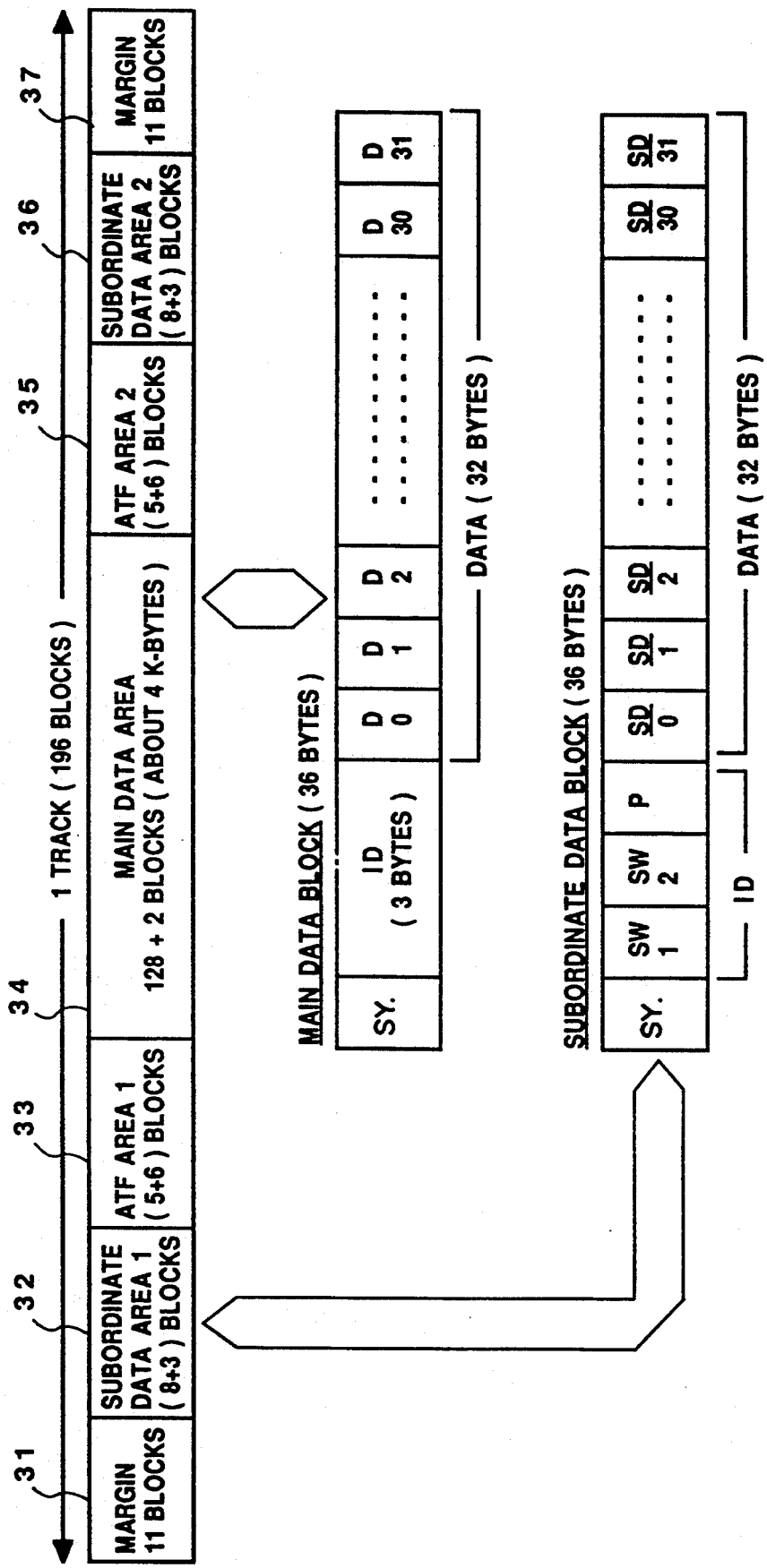
FIG. 3 is a diagram showing the arrangement of track data.

FIG. 3 illustrates a tape format for audio data in R-DAT specifications.

The data size recordable on one track is a total of 196 blocks (196×32=6 K-bytes). However, when ATF areas 33, 35 for controlling stable running of the tape and margin portions 31, 37, on which the recording of data cannot be assured, are excluded, the areas capable of data recording/playback are subordinate data areas 32, 36 and a main data area 34. Tape position (address) information is stored in the subordinate data areas 32, 36. In this embodiment, image data and information for managing the image data is stored in the main data area 34. Accordingly, the volume of image data on one track is about 4 K-bytes, and that of one frame (two tracks) is 8 K-bytes.

Figure 5:
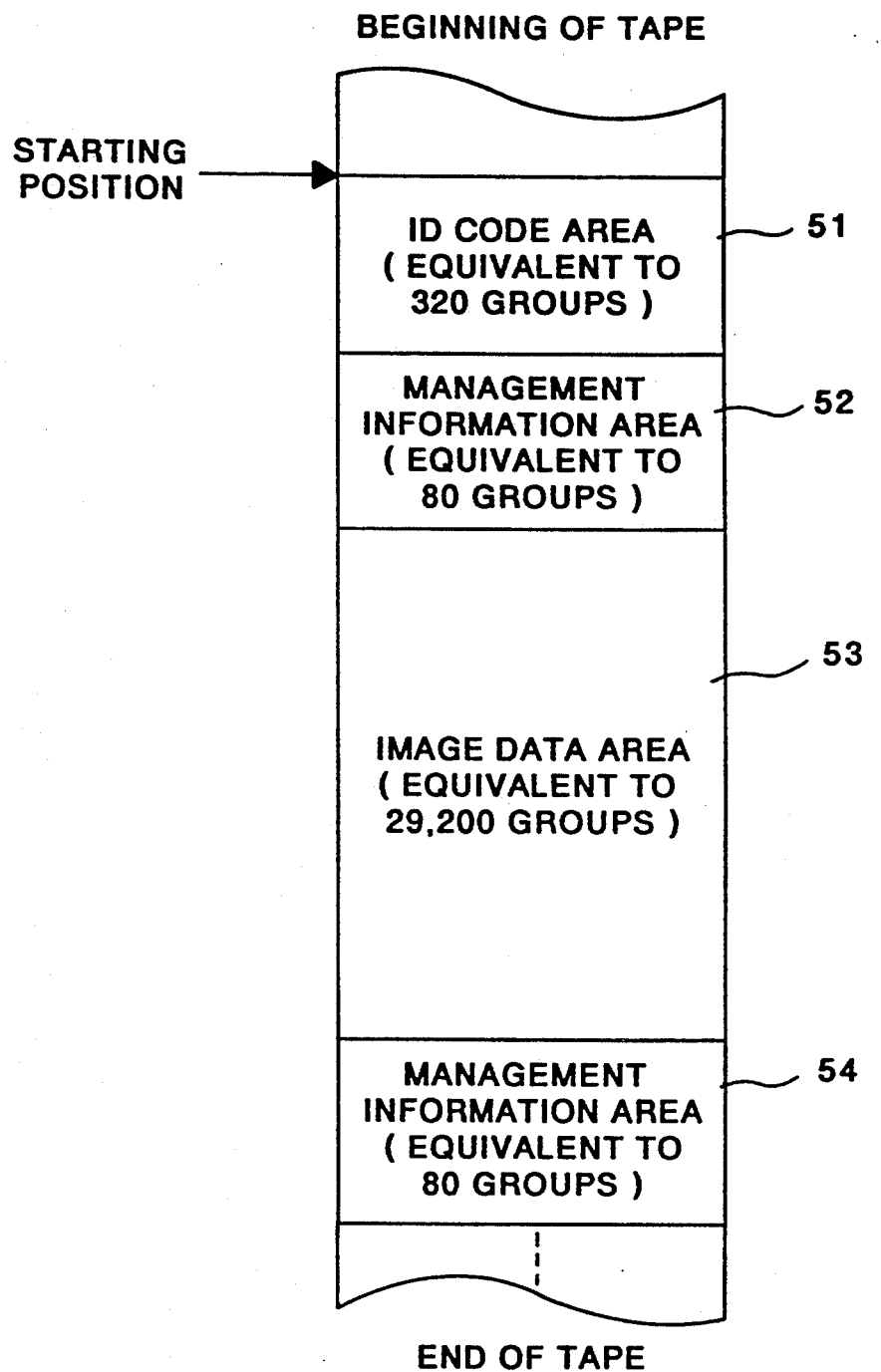

FIGS. 4 and 5 illustrate the tape format according to this embodiment of the present invention.

FIG. 4 is a diagram illustrating the concept of a group A group 40 consists of seven frames (56 K-bytes). Set at the beginning of each group 40 is a gap portion 41 composed of two frames (16 K-bytes) which assure enough safety margin if the tape should overrun at stopping and starting. No significant data is recorded in the gaps. The gap portion 41 is followed by an ID portion 42 composed of one frame (8 K-bytes). The ID portion 42 assures a reserve area necessary for any functional expansion in the future, such as with regard to the type of data stored within the group. The remaining four frames (32 K-bytes) of the group define an image data portion 43. The address of each group and the frame addresses of the areas are illustrated in FIG. 6.

FIG. 5 shows the overall data format. From the tape starting position, a space equivalent to 320 groups is furnished as a facsimile identification-code area 51. This is a code area for identifying whether the content of the tape is in a tape format capable of being handled by the facsimile apparatus. In this embodiment, a character string of the ten characters "DAT-FAX-01" is repeatedly recorded in continuous fashion.

The next area is a management-information area 52 having a space equivalent to 80 groups. The management-information area 52 stores transmission designating information, address information, within the tape, relating to image data corresponding to the transmission designating data, transmission-completion information, and address information, within the tape, relating to image data corresponding to the transmission-completion information.

Figure 6A:
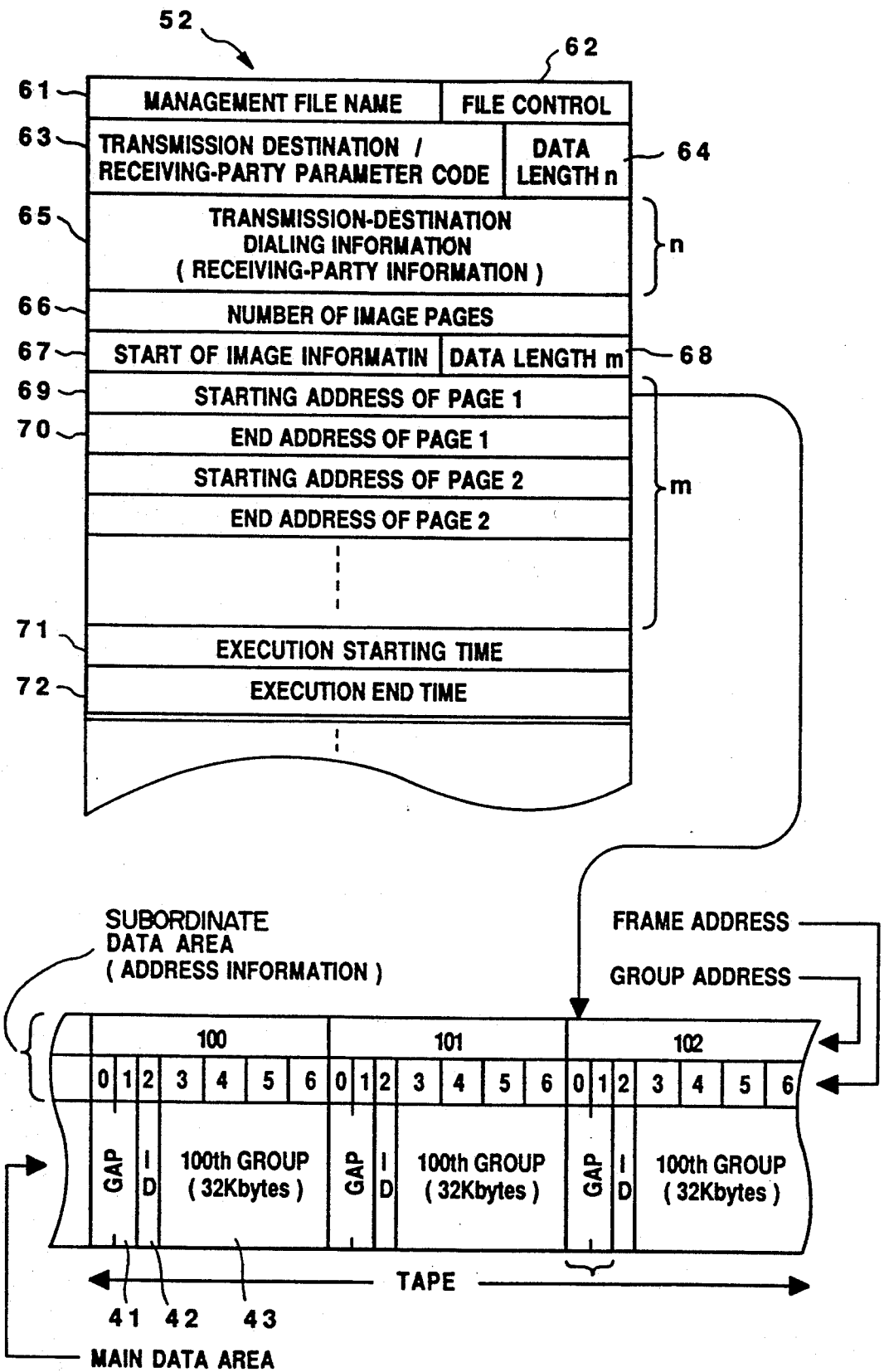

The relationship between the data arrangement within the management-information area 52 and the image data is illustrated in FIGS. 6A and 6B.

FIG. 6A is a diagram illustrating the constitution of the management-information area 52 and a designation of image data on the tape by means of a page starting address. Numeral 61 denotes a management file name, and numeral 62 denotes a bit indicating file control. As shown in FIG. 6B, types of management-file control are decided in accordance with values of "0" through "4" of the bit 62. Numeral 63 represents a code indicative of a transmission-destination/receiving-side parameter, and number 64 denotes data length, which is n in this example. Numeral 65 represents transmission-destination dialing information (or receiving-side information in case of reception) of data length n. The number of image pages stored is shown at 66, and a code indicative of the start of image information at 67. Numeral 68 denotes data length, which is m in this example, 69 the starting address of page 1, and 70 the end address of page 1. There are starting and end addresses for every succeeding page. Numeral 71 denotes the starting time of transmission or reception, and numeral 72 the end time of transmission and reception.

FIG. 6A illustrates a case in which the starting address of page 1 is, say, group/frame (102/0). This group address and frame address are stored in the subordinate data areas 32, 36 shown in FIG. 3. In this example, the starting address and end address together designate frame 0, and therefore starting/stopping of the tape begins at the gap portion of frame 0. This means that there will be no loss of image data in frames 3 through 6.

The management-information area is followed by the image-data area 53, which has enough space for 29200 groups (approximately 1 G-byte). All of the image data is stored in this area. When the image-data area ends, the next area is again a management-information area, namely area 54, equivalent to 80 groups. The management-information area 54 situated at the end of the tape is used as a save area for saving the information from the management area ahead of it on the tape. Specifically, as compared with a hard disk or the like, a tape exhibits less durability with regard to repeated access of the same area, and therefore tape quality declines when the same location is accessed many times. For this reason, the area 54 is used to save the important management information.

Image-data Buffer Control

Figure 7A:
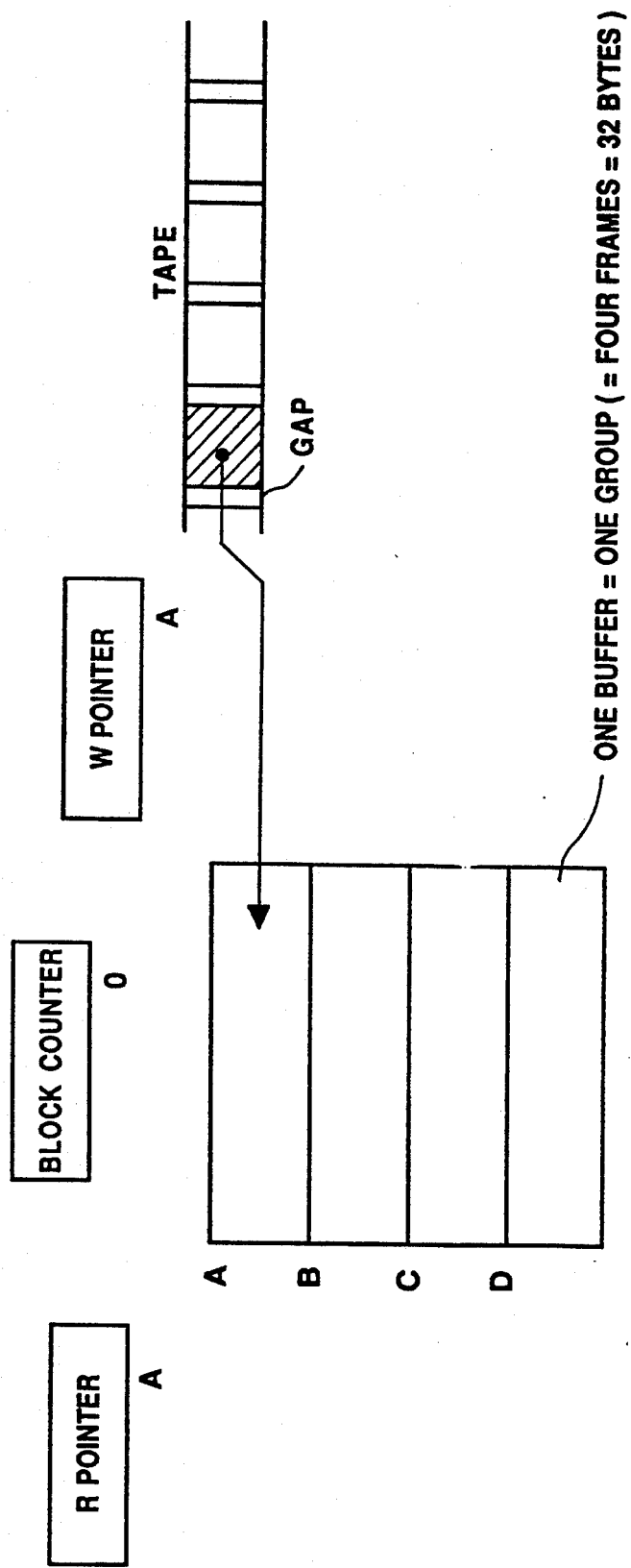
FIGS. 7A through 7C are diagrams for describing the operation of an image buffer memory for facsimile control.
Figure 7B:
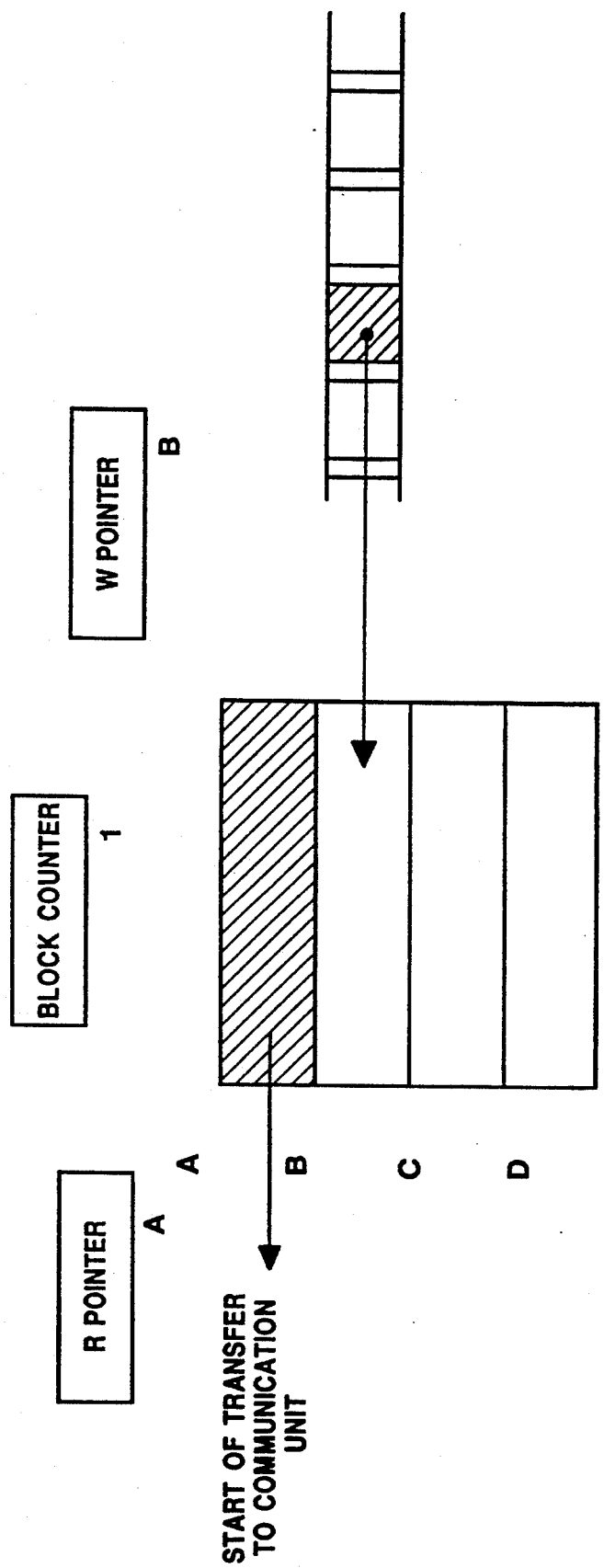
Figure 7C:
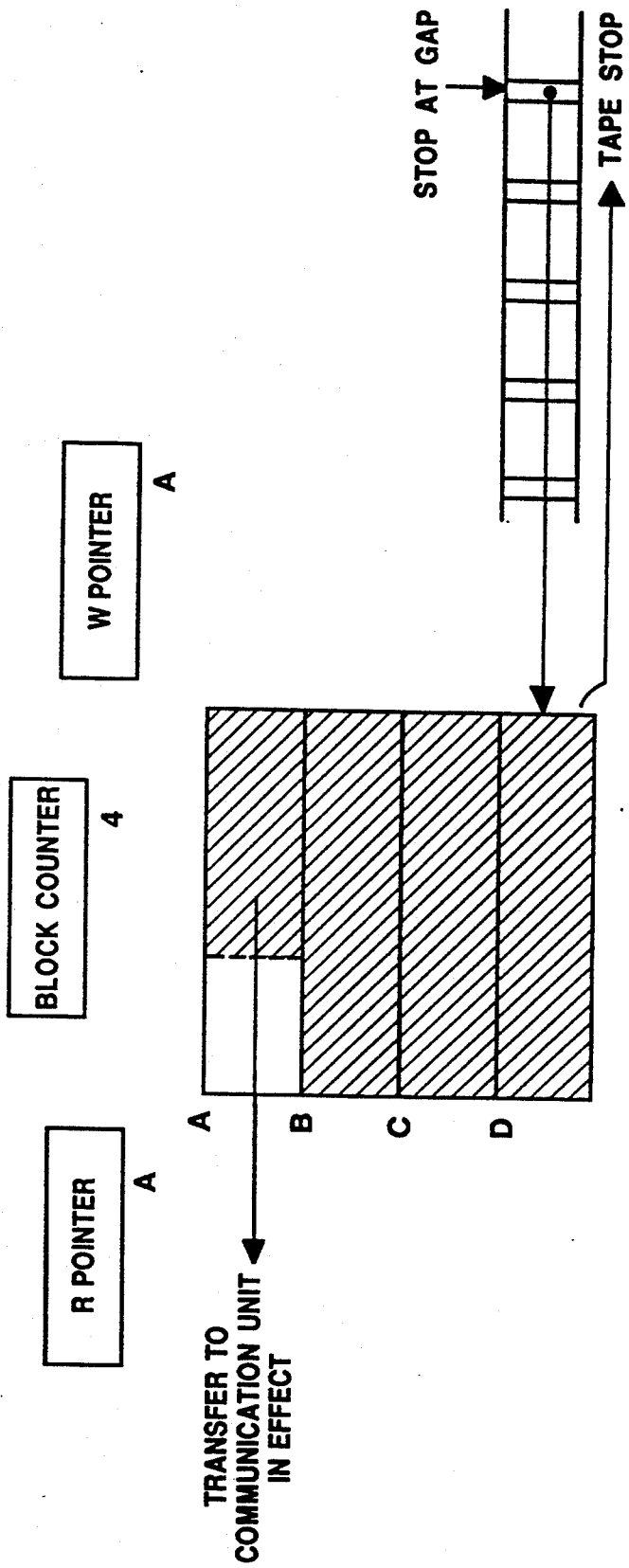
Figure 8A:
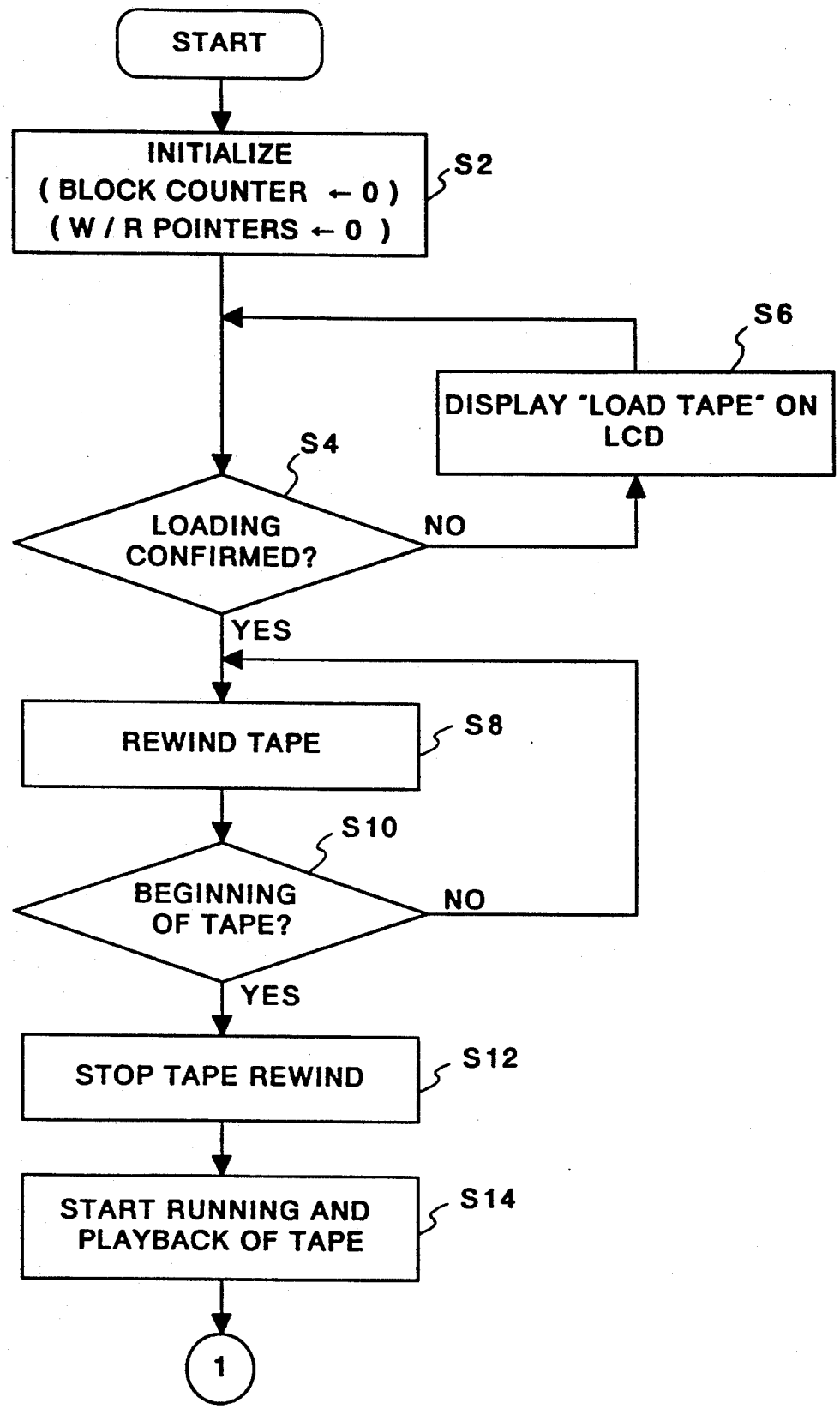
FIGS. 8A through 8E are flowcharts illustrating the overall control procedure executed in the embodiment.
Figure 8B:
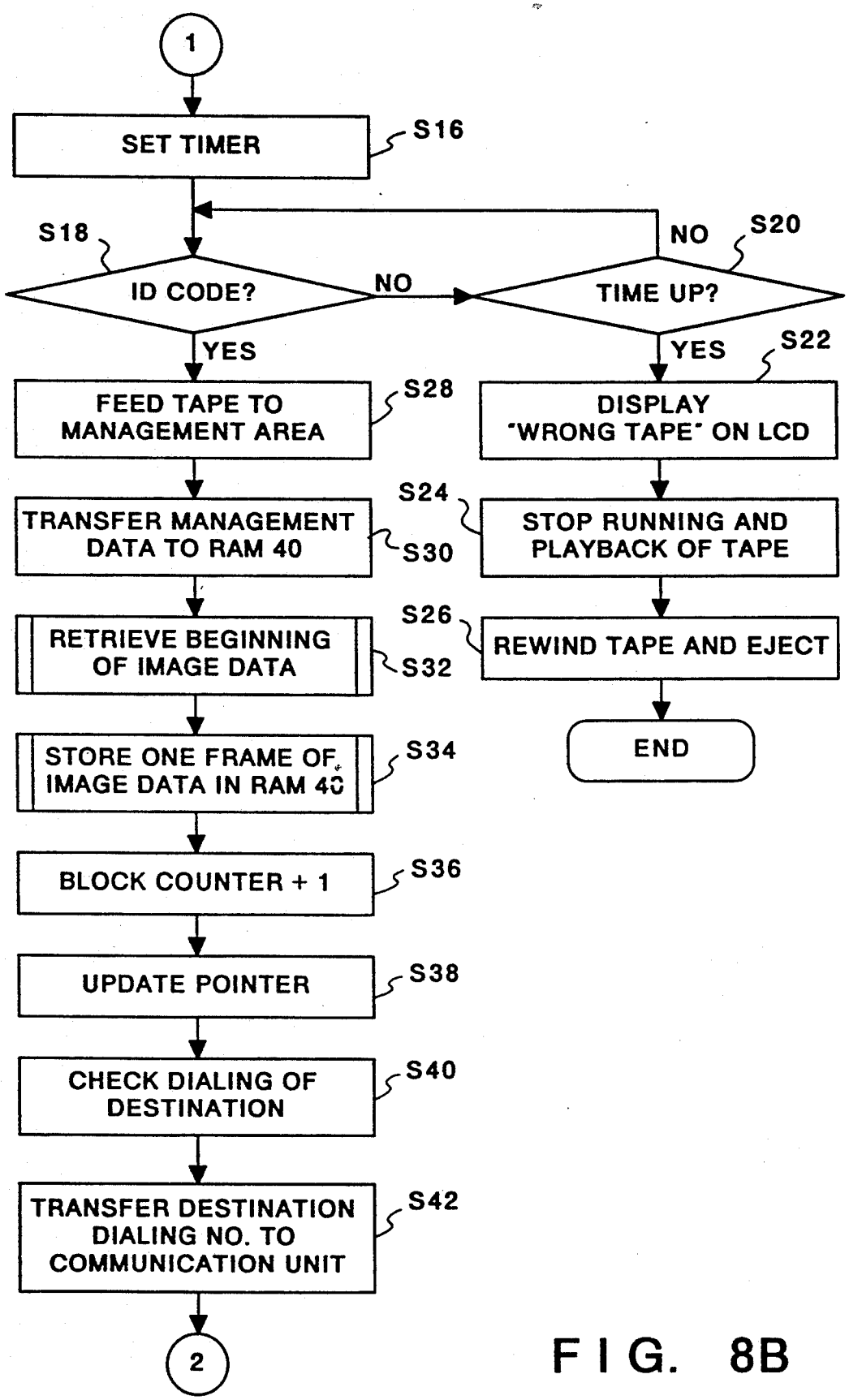
Figure 8C:
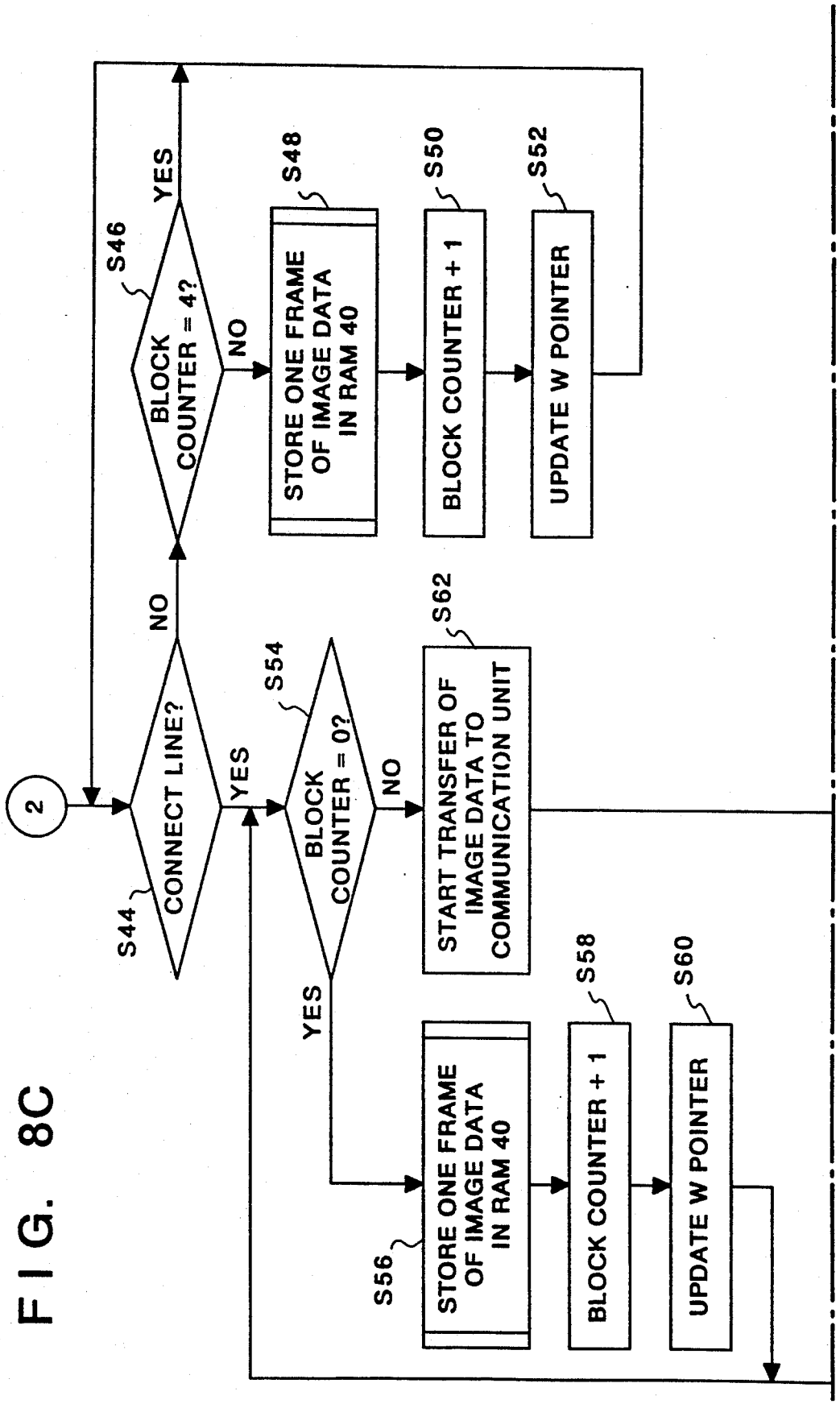
Figure 8D:
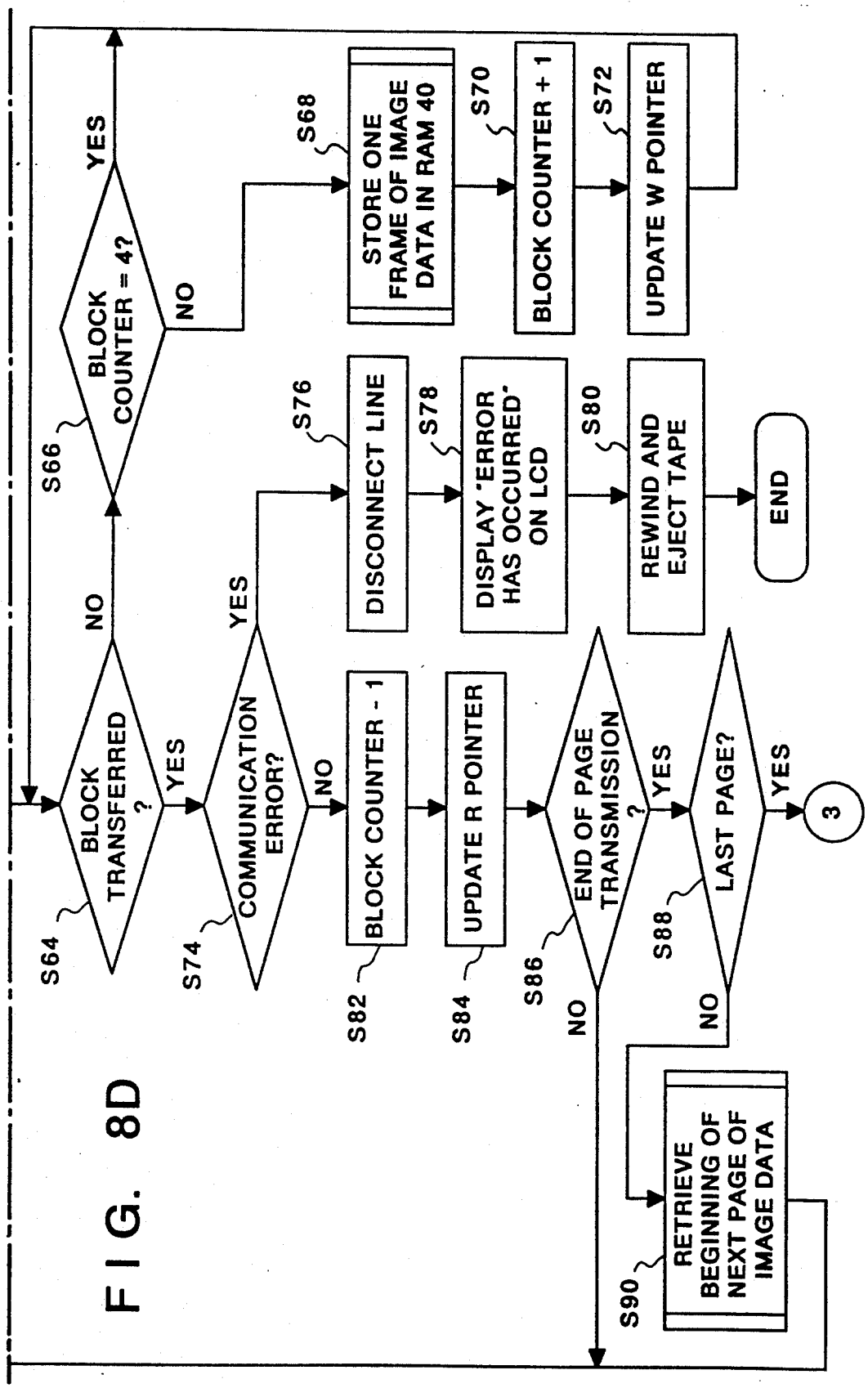
Figure 8E:
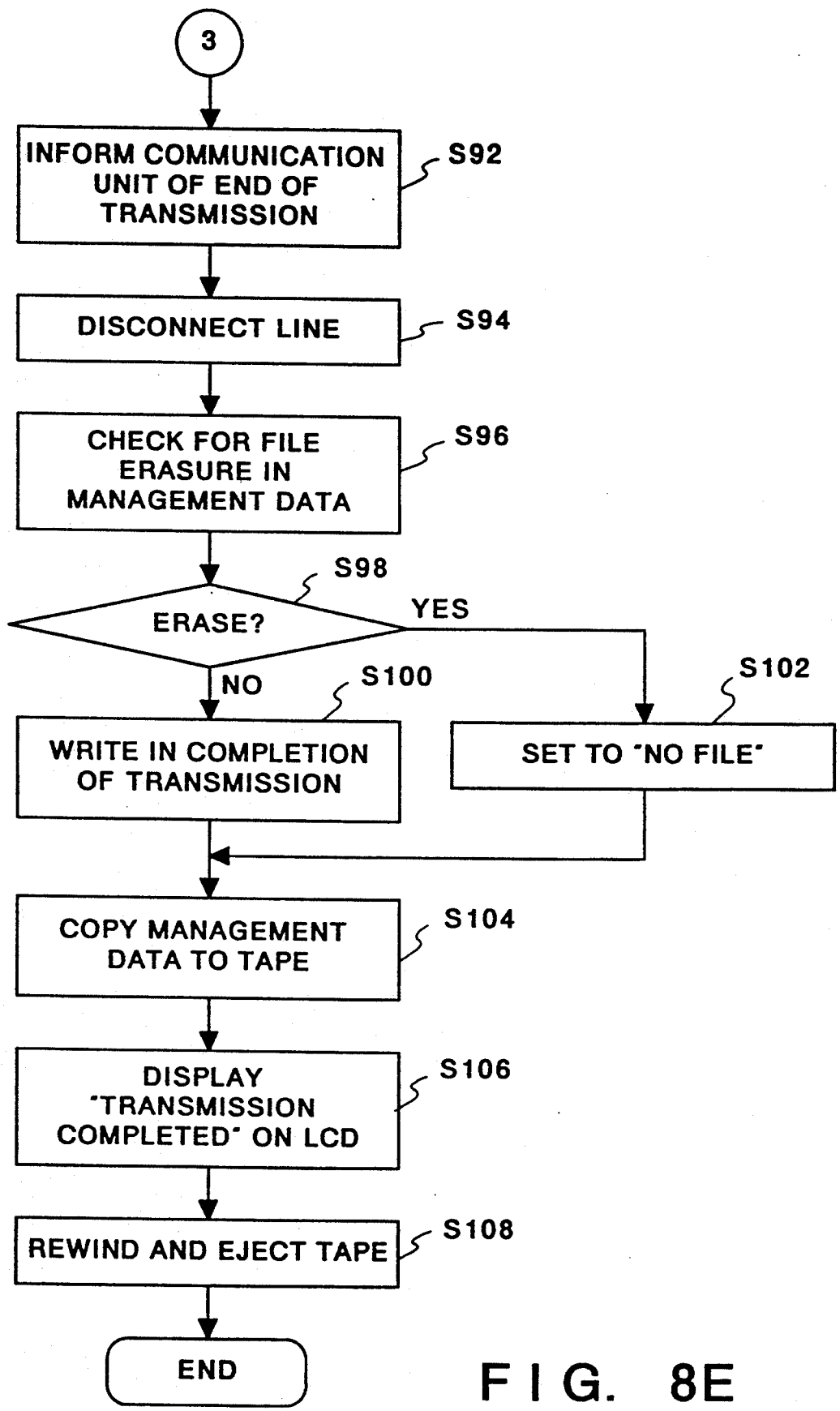

FIGS. 7A through 7C are diagrams used to describe a procedure for controlling the image-data buffer 40b within RAM 40. Here pointers at the beginning of each buffer (one group = 32 K-bytes) are taken as being A, B, C and D.

First, as shown in FIG. 7A, the reader pointer (R pointer) is set to A, the write pointer (W pointer) is set to A, and a block counter is set to 0 when initialization of values is performed. Accordingly, the image data from the tape is written in the buffer A. When the buffer A is filled to capacity, the W pointer becomes B and the count in the block counter becomes 1. In this embodiment, the image data stored from one gap to the next is taken as being one group, as shown in FIG. 4, and the capacities of the buffers are equal. Consequently, the tape and the buffers are synchronized.

Next, as shown in FIG. 7B, a transfer of image data from buffer A to the communication unit starts in accordance with the R pointer and, at the same time, the image data from the next area of the tape is written in buffer B in accordance with the W pointer.

As mentioned earlier, the data transfer rate is higher than the communication speed. Consequently, as shown in FIG. 7C, when the image data from the tape fills up the buffers through buffer D and the count in the block counter becomes 4 during the transfer from the buffer A to the communication unit, the tape is stopped and the system waits for buffer A to become vacant. The transfer of data from the tape to the buffers by the W pointer and the transmission of data from the buffers to the communication unit by the R pointer are controlled by the block counter, thereby making possible the transfer of image data without loss or overlapping of data.

Control Procedure of this Embodiment

FIGS. 8A through 8E are flowcharts illustrating the overall flow of processing according to this embodiment of the invention.

In this facsimile apparatus, use is made of a DAT as the tape mechanism, which employs a magnetic tape having facsimile identification information and designation information for image transmission located at the beginning, followed by the image data, as shown in FIG. 5.

Step S2 of the flowchart calls for initialization of values, such as the setting of the block counter, W pointer and R pointer to 0. Next, it is determined at step S4 whether the DAT has been loaded. This is done by detecting whether a light-receiving unit of the photosensor 313 (FIG. 2) is receiving light (OFF) or is not receiving light (ON). If the DAT has been loaded, then the program proceeds to step S8, at which the tape is automatically rewound (rapid-traverse). If the DAT has not been loaded, then a message reading "LOAD TAPE", which instructs the operator to load the tape, is displayed on the LCD at step S6. The system then waits for the operator to load the tape correctly. The beginning of the tape is searched for at step S10. If the beginning of the tape has been found, rewinding of the tape is ended at step S12; otherwise, the processing of step S8 continues to rewind the tape.

When rewinding ends, the program proceeds from step S12 to step S14, at which playback of the tape is started. The timer 10e is started at step S16. Upon elapse of a predetermined time, the facsimile identification code is searched for at step S18 to determine whether the information is facsimile information. If there is no facsimile information (i.e., if a facsimile identification code cannot be detected) and, moreover, the time runs out, then the program proceeds from step S20 to step S22, where a message reading "WRONG TAPE" is displayed on the LCD. Running and playback of the tape are halted at step S24, after which the tape rewound and ejected at step S26. If the tape is found to be valid at step S18, however, the program proceeds to step S28, where the tape is advanced to the management area, and then to step S30, where the management information in the management area of the DAT is transferred to the management-data buffer 40a in RAM 40. Next, the beginning of the image data is retrieved at step S32, one block of the image data is transferred to the image-data buffer 40b of RAM 40 at step S34, one is added to the block counter 106, which counts the block transfer-red to the RAM 40, at step S36, and the write pointer 10c designates the next blank data block at step S38.

The transmission-destination dialing information 65 shown in FIG. 6A is checked at step S40, and this information is transferred to the communication unit 20 as the destination dialing number at step S42. Next, it is determined at step S44 whether the line has been connected. If the line has not been connected, the whether the count in block counter 10b is 4. If the count in block counter 10b is 4, the system stands by for the line connection. If the count in block counter 10b is found to be 4 at step S46, one block of image data is transferred from the tape to the next buffer of image-data buffer 40b in the RAM 40 at step S48. The block counter 10b is incremented at step S50, and the write counter 10c designates the next blank data block at step S52. It is then again determined at step S44 whether the line has been connected.

In a case where the line is found to be connected at step S44, the program proceeds to step S54, at which it is determined whether the count in block counter 10b is 0. If the count is 0, one block of image data is transferred from the tape to the image-data buffer 40b in the RAM 40 at step S56. The block counter 10b is incremented at step S58, and the write counter 10c designates the next blank data block at step S60, after which the program returns to step S54. If it is found at step S54 that the count in block counter 10b is not 0, the image data in the image buffer indicated by the read pointer 10d is transferred to the communication unit 20 at step S62, and transmission from the connected line is started. It is determined at step S64 whether one block of data has been transmitted. If one block of data has not yet been transmitted, then, by means of a determination performed at step S66 as to whether the count in block counter 10b is 4 or not, the transfer of image data from the tape to the image buffer is carried out at step S68 through S72 in the same manner as at steps S46 through S52. When the transmission of one block ends, the program proceeds to step S74, where it is determined whether a communication error has occurred. In case of such an error, the line is disconnected at step S76, a message reading "ERROR HAS OCCURRED" is displayed on the LCD at step S78, and the tape is rewound rapidly and ejected at step S80.

Next, at step S82, the block counter 10b is decremented, and step S84 calls for the read counter 10d to designate the data block to be read next. It is determined at step S86 whether transmission of the page has ended. If transmission of the page has not ended, the program returns to step S54. If this transmission has ended, it is determined at step S88 this pages is the last page. If it is not the last page, the tape is fast-forwarded or rewound to retrieve the beginning of the image data on the next page at step S90, after which the program returns to step S54. If the page is found to be the last page at step S88, then the CPU 10 notifies the communication unit 20 at step S92 of the fact that communication has ended, and the line is disconnected at step S94.

Step S96 calls for the retrieval of file-erasure information in the management information shown in FIG. 6B, and it is determined at step S98 whether a transmitted file is to be erased. In case of erasure, the management information in FIG. 6A is cleared from the RAM at step S102, and file control 62 is set to "4", meaning "no file". If file erasure is not to be performed, file control 62 of the management information in FIG. 6A is set to "3", meaning "transmission completed", and this is written in the RAM 90, at step S100. The management-data buffer 40a of RAM 40 is copied to the management information area 52 of the DAT at step S104, a message reading "TRANSMISSION COMPLETED" is displayed on the LCD 70 at step S106, and the tape is rewound rapidly and ejected at step S108.

Figure 9:
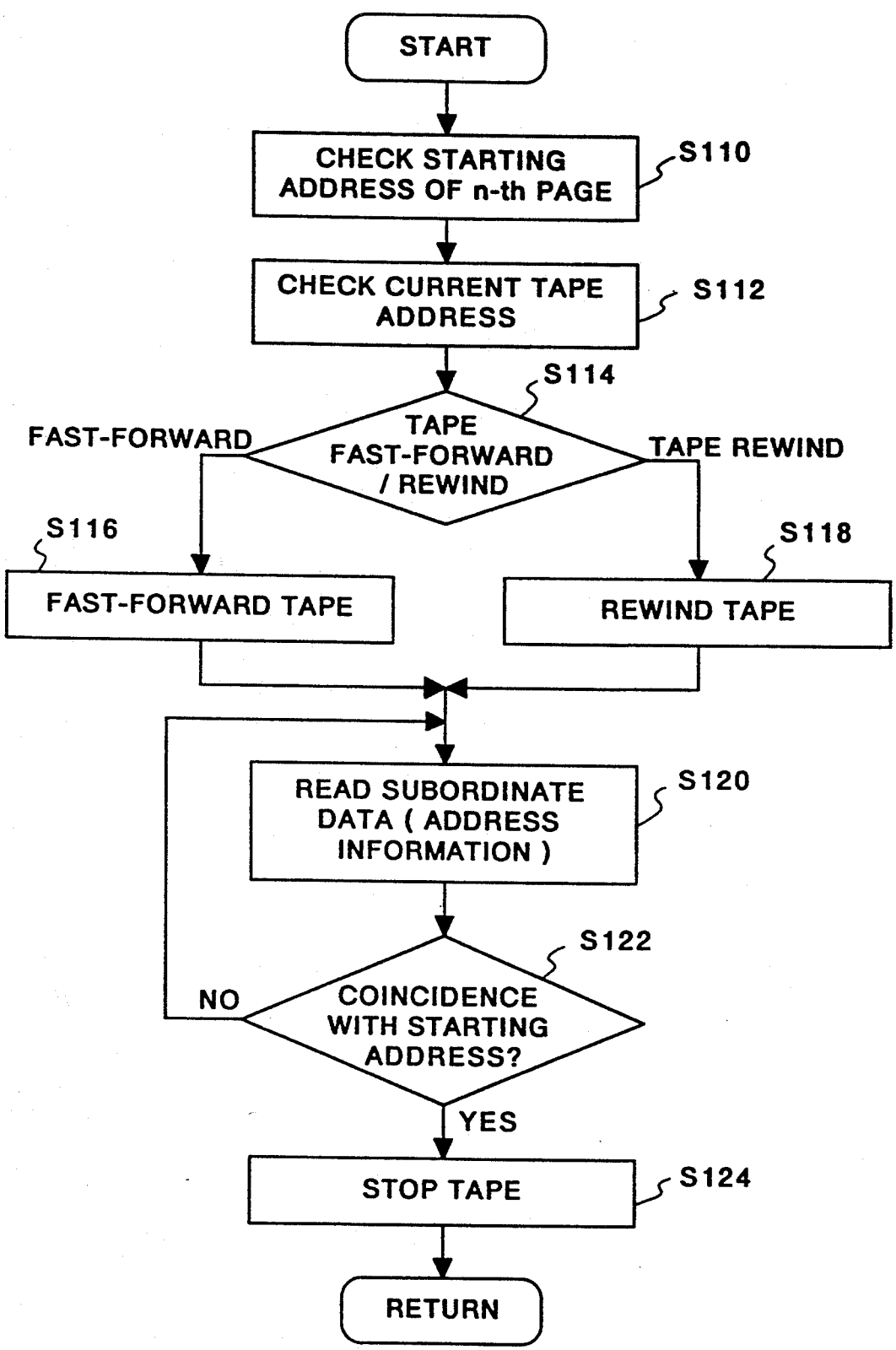
FIG. 9 is a flowchart illustrating a routine for retrieving the beginning of a page of image data.

FIG. 9 is a flowchart illustrating the details of the routine for retrieving the beginning of the image on the tape, namely the routine of steps S32, S90 in the flowcharts of FIGS. 8A through 8D of this embodiment.

Steps S110 and S112 call for the current position of the tape to be compared with the starting address information of the page to be retrieved. In order to move the tape to the starting address sought, it is determined at step S114 whether the tape is to be fed forward or rewound. Forward-feed (or rewinding) is started at step S116 (or step S118). While tape address information (shown in FIG. 6A) from the subordinate data input-/output interface 315 shown in FIG. 2 is read out at step S120, it is determined at step S122 whether there is coincidence with the address sought. If the two coincide, the tape is stopped at step S124, and the program returns. In this example, the address decision at step S112 is based upon an AND condition, namely that there is coincidence with the group address and that the frame address is 0. In this way the tape position is always set to the beginning of a group at the time of tape playback.

Figure 10:
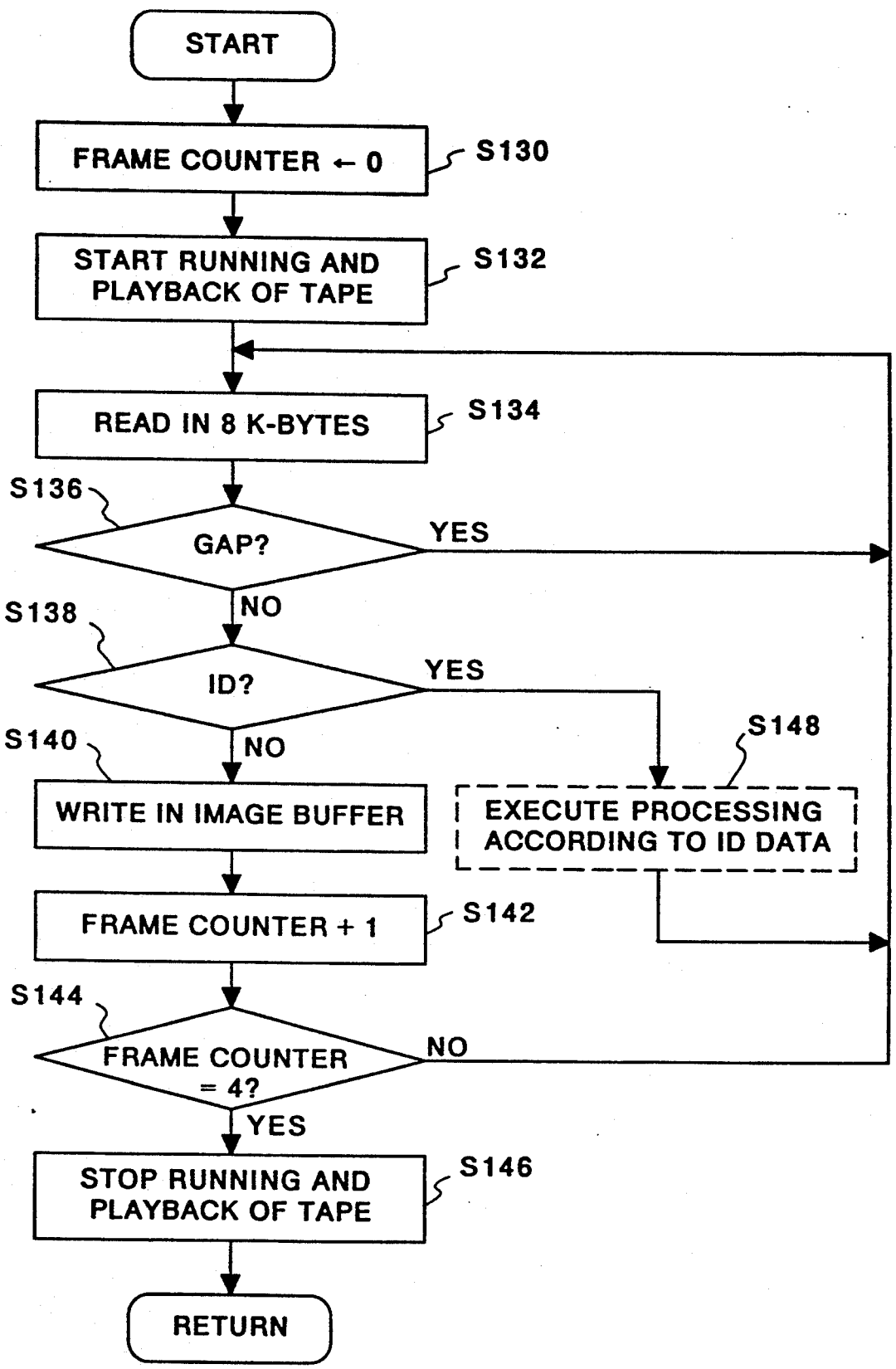
FIG. 10 is a flowchart illustrating a transfer routine for transmitting image data from the digital recording tape to the image buffer.

FIG. 10 is a flowchart illustrating the details of the routine for transferring one block of image data to the RAM 40, namely the routine of steps S32, S48, S56, S68 in the flowcharts of FIGS. 8A through 8D of this embodiment.

First, the frame counter 10a is set to 0 at step S130. Then, at step S132, running and playback of the tape are started, and 8 K-bytes of data is read in at step S134. Next, it is determined at step S136 whether the 8 K-bytes constitute a gap, and it is determined at step S138 whether the 8 K-bytes constitutes an ID. In case of an ID, an escape function, which is not illustrated in this example, is implemented, the program returns to step S134, and the next 8 K-bytes of data is read in. If it is determined at steps S136 and 138 that the 8 K-bytes of data is neither a gap nor an ID, this means that the data is image data. Accordingly, the image data is written in the image buffer, which is currently indicated by the W pointer 10c, at step S140. The frame counter 10a is incremented at step S142, and it is determined at step S144 whether the count in frame counter 10a is 4. If the count is not 4, the program returns to step S134 and the next item of image data is read in. If the count is 4, then running and playback of the tape are stopped at step S146, and the program returns.

FIG. 11 is a diagram showing the command sequence between the facsimile controller (CPU) 10 and facsimile communication unit 20, as well as the procedure for communication between the network side and the facsimile communication unit. The communication procedure will be described in accordance with FIG. 11.

Since the facsimile apparatus in this example is a G4 facsimile apparatus connected to an ISDN line, first the CPU 10 sends destination information ① to the communication unit 20. The latter transmits a SET-UP command ② on a D channel, and if a CONN signal ③ is sent back from the network, then CONN-ACK ④ is returned. Here the other party's machine and the B channel are connected. The communication unit 20 informs the CPU 10 of connection completion ⑤. The CPU 10 sends image data ⑥ to the communication unit 20, and the latter transfers the image data ⑦ to the other party's machine. The line speed is 8 K-bytes/sec. It should be noted that since the speed of transfer from the DAT is about 150-160 K-bytes/sec, data underrunning does not occur. This operation continues the CPU gives notification of communication end ⑧, and the communication unit sends DISK ⑨ to the network, waits for REL and releases the line at .

With regard to the magnetic tape recording/playback mechanism, it is assumed in this embodiment that the mechanism is incorporated within the facsimile apparatus, and that the mechanism is connected by the CPU bus. However, a case is conceivable in which a facsimile system is constructed in such a manner that the mechanism is connected through a general-purpose I/F or the like, as in an SCSI established by ANSI specifications. The system configuration in such case would be as follows: facsimile apparatus ⟷ general-purpose interface ⟷ tape mechanism. Here it would be possible to utilize signals on the general-purpose interface to realize tape control as in this embodiment and a method of handling various types of data recorded on the tape. It would be permissible at such time to install the RAM (the image buffer), which is on the side of the facsimile apparatus described in this embodiment, on the side of the tape mechanism. Further, though a DAT is employed as the tape in this embodiment, structurally it is permissible to use magnetic tapes such as an 8 mm video tape, VTR tape, etc.

In the present embodiment, an image for transmission is digitally recorded on magnetic tape. This makes it possible to deal with an increase in the information volume of image data resulting from advances in digital image processing techniques and image colorization.

Further, the DAT serving as the memory medium in the facsimile apparatus of this embodiment has a large capacity on the order of that possessed by a hard disk, and the DAT is low in cost. This make possible a facsimile apparatus having a large memory capacity and a low cost.

Since the DAT serving as the memory medium in the facsimile apparatus of this embodiment is highly compact, the memory medium exhibits excellent data convertibility and portability, and maintenance is easy to perform since the memory medium can be loaded and unloaded with ease.

All information related to the transmission of image data is recorded on a magnetic tape (a DAT in the illustrated embodiment), and transmission is performed automatically by reading the tape. This makes it possible to eliminate such operations as dialing of a telephone number when a transmission is to be made.

With a conventional facsimile apparatus, an original is brought to the apparatus and is then read by a scanner and transmitted. However, with a facsimile apparatus using a compact memory medium as in the illustrated embodiment, it is possible acquire information from a wide variety of locations by using a compact scanner capable of recording images on a magnetic tape.

Thus, according to the present invention, there is provided a facsimile apparatus having an image-data storage medium which is inexpensive, large in capacity and versatile in terms of handling.

More specifically, the drawbacks of the conventional facsimile apparatus, namely high price and large size, are eliminated by utilizing a magnetic tape recording/playback mechanism as a source of stored image data, and providing an image data memory on the magnetic tape.

As many apparently widely different embodiments of the invention can be made without departing from the invention is not limited to the specific embodiments thereof except as defined in the appended claims.

What is claimed is:

1. A facsimile apparatus having a large-capacity storage medium for storage of image data, the apparatus comprising:

a digital magnetic tape device including a digital magnetic tape as the large-capacity storage medium;

memory means for storing, on said digital magnetic tape, in a prescribed format based upon a prearranged storage format corresponding to said digital magnetic tape, at least a facsimile identification code which represents that image data for the facsimile apparatus has been stored on the tape, management information which includes control information for controlling transmission and reception of the facsimile apparatus and position information indicating a storage position of the image data on said digital magnetic tape, and image data to be transmitted or received by the facsimile apparatus, and image transmission means for performing transmission and reception of the image data based upon the information on said digital magnetic tape stored in the prescribed format based upon said prearranged storage format.

2. The facsimile apparatus according to claim 1, wherein gaps in accordance with said prearranged format and transmission or reception of the image data are provided on said digital magnetic tape at fixed intervals; and said memory means including stopping means for stopping said digital magnetic tape at positions of the gaps.

3. A facsimile apparatus having a large-capacity storage medium for storage of image memory comprising:

a digital magnetic tape device including a digital magnetic tape as the large-capacity storage medium;

memory means for storing, on said digital magnetic tape, in a prescribed format based upon a prearranged storage format corresponding to said digital magnetic tape, at least a facsimile identification code which represents that image data for the facsimile apparatus has been stored on the tape, management information which includes control information for controlling transmission and reception of the facsimile apparatus and position information indicating storage position of the image data on said digital magnetic tape, and image data to be transmitted or received by the facsimile apparatus; and image transmission means for performing transmission and reception of the image based upon the information on said digital magnetic tape stored in the prescribed format based upon said prearranged storage format.

wherein gaps in accordance with said prearranged format are provided on said digital magnetic tape at fixed intervals; and said memory means including stopping means for stopping said digital magnetic tape at positions of the gaps; and wherein the position information is stored on said digital magnetic tape at predetermined areas in correspondence with said gaps and represents the positions of these areas, and said output means stops, plays back and rewinds said digital magnetic tape in accordance with the position information.

4. The apparatus according to claim 3, wherein said digital magnetic tape is a digital audio tape;

a storage area for said image data, said management information and said facsimile identification code comprises, in repetitive fashion, said gap, which consists of a predetermined number of tracks, and a data area consisting of a predetermined number of tracks; said position information is stored in a subordinate data area of each track; and said image data, said management information and said facsimile identification code are stored in a main data area of each track.

5. The apparatus according to claim 4, wherein said image transmission means has at least two buffers for temporarily holding image data to be transmitted, and the capacity of said buffers corresponds to the capacity of the data area of said predetermined number of tracks.

6. A facsimile apparatus for receiving image data and storing the received image data in a large-capacity storage medium, the apparatus comprising:

a digital magnetic tape device including a digital magnetic tape as the large-capacity storage medium;

means for generating facsimile identification information which represents that image data for the facsimile apparatus has been stored on the tape and management information which includes position information indicating a storage position of the image data on the digital magnetic tape;

means for storing at least the facsimile identification information, the management information and the received image data on the digital magnetic tape in a prescribed format based upon a prearranged storage format corresponding to the digital magnetic tape; and output means for reproducing the image data from the digital magnetic tape in accordance with the facsimile identification information and the management information and the management information stored in the digital magnetic tape, and outputting the image data.

7. The apparatus according to claim 6, wherein gaps in accordance with the prearranged storage format and reception of the image data are provided on the digital magnetic tape at fixed intervals; and said output means includes stopping means for stopping the digital magnetic tape at the positions of the gaps.

8. A facsimile apparatus for receiving image data and storing the received image data in a large-capacity storage medium, the apparatus comprising:

a digital magnetic tape device including a digital magnetic tape as the large-capacity storage medium;

means for generating facsimile identification information which represents that received image data has been stored on the tape and management information which includes position information indicating a storage position of the image data on the digital magnetic tape;

means for storing at least the facsimile identification information, the management information and the received image data on the digital magnetic tape in a prescribed format based upon a prearranged storage format corresponding to the digital magnetic tape; and output means for reproducing the image data from the digital magnetic tape in accordance with the facsimile identification information and the management information stored in the digital magnetic tape, and outputting the image data, wherein gaps in accordance with the prearranged storage format are provided on the digital magnetic tape at fixed intervals; and said output means includes stopping means for stopping the digital magnetic tape at the positions of the gaps, and wherein the position information is stored on the digital magnetic tape at predetermined areas in correspondence with said gaps and represents the positions of these areas; and said output means stops, play back and rewinds said digital magnetic tape in accordance with the position information.

9. The apparatus according to claim 8, wherein said digital magnetic tape is a digital audio tape, and wherein a storage area for said image data, said management information and said facsimile identification code comprises, in repetitive fashion, said gap, which consists of a predetermined number of tracks, and a data area consisting of a predetermined number of tracks;

said position information being stored in a subordinate data area of each track; and said image data, said management information and said facsimile identification code being stored in a main data area of each track.

10. A facsimile apparatus for transmitting an image data stored on a large-capacity storage medium;

means for generating image data to be transmitted;

memory means for storing, on the digital magnetic tape, in a prescribed format based upon a prearranged storage format corresponding to the digital magnetic tape, at least a facsimile identification code which represents that image data for transmission has been stored on the tape, management information which includes control information for controlling transmission of the facsimile apparatus and position information indicating a storage position of the image data on the digital magnetic tape, and the generated image data; and image transmission means for reproducing the image data from the digital magnetic tape and transmitting the image data, in accordance with the information stored on the digital magnetic tape in the prescribed format based upon said prearranged storage format.

11. The apparatus according to claim 10, wherein gaps in accordance with said prearranged storage format and transmission of the image data are provided on said digital magnetic tape at fixed intervals; and said memory means includes stopping means for stopping said digital magnetic tape at positions of the gaps.

12. A facsimile apparatus for transmitting image data stored on a large-capacity storage medium, the apparatus comprising:

a digital magnetic tape device including a digital magnetic tape as the large-capacity storage medium, means for generating image data to be transmitted;

memory means for storing, on the digital magnetic tape, in a prescribed format based upon a prearranged storage format corresponding to the digital magnetic tape, at least a facsimile identification code which represents that image data for transmission has been stored on the tape, management information which includes control information for controlling transmission of the facsimile apparatus and position information indicating a storage position of the image data on the digital magnetic tape, and the generated image data; and image transmission means for reproducing the image data from the digital magnetic tape and transmitting the image data, in accordance with the information stored on the digital magnetic tape in the prescribed format based upon said prearranged storage format, wherein gaps in accordance with said prearranged storage format are provided on said digital magnetic tape at fixed intervals; and said memory means includes stopping means for stopping said digital magnetic tape at positions of the gaps, and wherein the position information is stored on said digital magnetic tape at predetermined areas in correspondence with said gaps and represents the positions of these areas; and said memory means stops, plays back and rewinds said digital magnetic tape in accordance with said position information.

13. The apparatus according to claim 12, wherein said digital magnetic tape is a digital audio tape, and wherein a storage means for said image data, said management information and said facsimile information code comprises, in repetitive fashion, said gap, which consists of a predetermined number of tracks, and a data area consisting of a predetermined number of tracks;

said position information being stored in a subordinate data area of each track; and said image data, said management information and said facsimile identification code being stored in a main data area of each track.

14. The apparatus according to claim 13, wherein said image transmission means has at least two buffers for temporarily holding data to be transmitted, and a capacity of said buffers corresponds to a capacity of the data area of said predetermined number of tracks.

15. A method for receiving image data and storing the received image data in a large-capacity storage medium, comprising the steps of:

preparing a digital magnetic tape as the large-capacity storage medium;

generating facsimile identification information which represents that image data for the facsimile apparatus has been stored on the tape and management information which includes position information indicating storage position of the image data on the digital magnetic tape;

storing at least the facsimile identification information, the management information and the received image data on the digital magnetic tape in a prescribed format based upon a prearranged storage format corresponding to the digital magnetic tape;

reproducing the image data from the digital magnetic tape in accordance with the facsimile identification information and the management information stored in the digital magnetic tape; and outputting the image data.

16. The method according to claim 15, wherein gaps in accordance with the prearranged storage format are provided on the digital magnetic tape at fixed intervals; and in said reproducing step, the digital magnetic tape is stopped at the positions of the gaps.

17. A method for receiving image data and storing the received image data in a large-capacity storage medium, comprising the steps of:

preparing a digital magnetic tape as the large-capacity storage medium;

generating facsimile identification information which represents that received image data has been stored on the tape and management information which includes position information indicating a storage position of the image data on the digital magnetic tape;

storing at least the facsimile identification information, the management information and the received image data on the digital magnetic tape in a prescribed format based upon a prearranged storage format corresponding to the digital magnetic tape;

reproducing the image data from the digital magnetic tape in accordance with the facsimile identification information and the management information stored in the digital magnetic tape; and outputting the image data, wherein gaps in accordance with the prearranged storage format are provided on the digital magnetic tape at fixed intervals; and in said reproducing step, the digital magnetic tape is stopped at the positions of the gaps, and wherein the position information is stored on the digital magnetic tape at predetermined areas in correspondence with said gaps and represents the positions of these areas; and in said reproducing step, said digital magnetic tape is stopped, played back and rewound in accordance with the position information.

18. The method according to claim 17, wherein said digital magnetic tape is a digital audio tape, and wherein a storage area for said image data, said management information and said facsimile identification code comprises, in repetitive fashion, said gap, which consists of a predetermined number or tracks, and a data area consisting of a predetermined number of tracks;

said position information being stored in a subordinate data area of each track; and said image data, said management information and said facsimile identification code being stored in a main data area of each track.

19. A method for transmitting image data stored on a large-capacity storage medium, comprising:

preparing a digital magnetic tape as the large-capacity storage medium;

generating image data to be transmitted;

storing, on the digital magnetic tape, in a prescribed format based upon a prearranged storage format corresponding to the digital magnetic tape, at least a facsimile identification code which represents that image data for transmission has been stored on the tape, management information which includes control information for controlling transmission of the facsimile apparatus and position information indicating storage position of the image data on the digital magnetic tape, and the generated image data;

reproducing the image data from the digital magnetic tape; and transmitting the image data, in accordance with the information stored on the digital magnetic tape in the prescribed format based upon said prearranged storage format.

20. The method according to claim 19, wherein gaps in accordance with said prearranged storage format are provided on said digital magnetic tape at fixed intervals; and in said reproducing step, said digital magnetic tape is stopped at positions of the gaps.

21. A method for transmitting image data stored on a large-capacity storage medium, comprising the steps of:

preparing a digital magnetic tape as the large-capacity storage medium;

generating image data to be transmitted;

storing, on the digital magnetic tape, in a prescribed format based upon a prearranged storage format corresponding to the digital magnetic tape, at least a facsimile identification code which represents that image data for transmission has been stored on the tape, management information which includes control information for controlling transmission of the facsimile apparatus and position information indicating storage position of the image data on the digital magnetic tape, and the generated image data;

reproducing the image data from the digital magnetic tape; and transmitting the image data, in accordance with the information stored on the digital magnetic tape in the prescribed format based upon said prearranged storage format, wherein gaps in accordance with said prearranged storage format are provided on said digital magnetic tape at fixed intervals; and in said reproducing step, said digital magnetic tape is stopped at positions of the gaps, and wherein the position information is stored on said digital magnetic tape at predetermined areas in correspondence with said gaps and represents the positions of these areas; and in said reproducing step, said digital magnetic tape is stopped, played back and rewound in accordance with said position information.

22. The method according to claim 21, wherein said digital magnetic tape is a digital audio tape, and wherein a storage area for said image data, said management information and said facsimile identification code comprises, in repetitive fashion, said gap, which consists of a predetermined number of tracks, and a data area consisting of a predetermined number of tracks;

said position information being stored in a subordinate data area of each track; and said image data, said management information and said facsimile identification code being stored in a main data area of each track.

23. The method according to claim 22, wherein in said transmitting step, at least two buffers for temporarily holding image data to be transmitted are used, and the capacity of said buffers corresponds to the capacity of the data area of said predetermined number of tracks.

* * * * *

UNITED STATES PATENT AND TRADEMARK OFFICE
CERTIFICATE OF CORRECTION

PATENT NO. : 5,258,853
DATED : November 2, 1993
INVENTOR(S) : HIROSHI NOBUTA, ET AL.

It is certified that error appears in the above-identified patent and that said Letters Patent is hereby corrected as shown below:

COLUMN 9

Line 6, "the whether" should read --the program proceeds to step S46, at which it is determined whether--.

COLUMN 10

Line 8, "8D" should read --8E--.
Line 30, "8D" should read --8E--.

COLUMN 11

Line 4, "continues the" should read --continues until the end of image transfer. When the transfer ends, the--.

Line 7, "REL    " should read --REL (10)-- and "at   ." should read --at (11)--.

COLUMN 12

Line 2, "from the" should read --from the spirit and scope thereof, it is to be understood that the--.

UNITED STATES PATENT AND TRADEMARK OFFICE
CERTIFICATE OF CORRECTION

PATENT NO. : 5,258,853

DATED : November 2, 1993

INVENTOR(S) : HIROSHI NOBUTA, ET AL.

It is certified that error appears in the above-identified patent and that said Letters Patent is hereby corrected as shown below:

<u>COLUMN 14</u>

Line 17, "play" should read --plays--.
    Line 64, "dium," should read --dium;--.

Signed and Sealed this

Seventh Day of June, 1994

Attest:

BRUCE LEHMAN

Attesting Officer      Commissioner of Patents and Trademarks